(12) United States Patent
Loc et al.

(10) Patent No.: US 7,248,568 B1
(45) Date of Patent: Jul. 24, 2007

(54) APPARATUS FOR DETECTING HIDDEN NODES IN A WIRELESS NETWORK

(75) Inventors: Peter Loc, Santa Clara, CA (US);
Joseph Knapp, San Mateo, CA (US);
Senthil K. Arumugham, Sunnyvale, CA (US); Heng-Jui Hsu, San Jose, CA (US)

(73) Assignee: Marvell International, Ltd., Hamilton (BM)

( * ) Notice: Subject to any disclaimer, the term of this patent is extended or adjusted under 35 U.S.C. 154(b) by 962 days.

(21) Appl. No.: 10/085,683

(22) Filed: Feb. 26, 2002

(51) Int. Cl.
*H04J 3/24* (2006.01)
(52) U.S. Cl. ...................................... 370/312; 709/242
(58) Field of Classification Search ........ 370/235–240, 370/247, 255, 400–411
See application file for complete search history.

(56) References Cited

U.S. PATENT DOCUMENTS

| 5,574,860 | A | | 11/1996 | Perlman et al. |
| 5,594,731 | A | | 1/1997 | Reissner |
| 5,654,959 | A | | 8/1997 | Baker et al. |
| 5,661,727 | A | | 8/1997 | Kermani et al. |
| 5,768,531 | A | * | 6/1998 | Lin ............................. 709/242 |
| 5,812,531 | A | * | 9/1998 | Cheung et al. ............. 370/255 |
| 6,236,662 | B1 | | 5/2001 | Reilly |
| 6,292,475 | B1 | * | 9/2001 | Swail .......................... 370/329 |
| 6,519,268 | B1 | * | 2/2003 | Smyers ....................... 370/536 |
| 6,580,704 | B1 | * | 6/2003 | Wellig et al. ................ 370/338 |
| 6,714,559 | B1 | * | 3/2004 | Meier .......................... 370/449 |
| 6,791,962 | B2 | * | 9/2004 | Wentink ...................... 370/338 |
| 2003/0061426 | A1 | * | 3/2003 | Connor ....................... 710/265 |
| 2004/0221080 | A1 | * | 11/2004 | Connor ....................... 710/260 |
| 2005/0232213 | A1 | * | 10/2005 | Meier .......................... 370/338 |

FOREIGN PATENT DOCUMENTS

WO   WO 01/55854 A1   8/2001

* cited by examiner

*Primary Examiner*—Chi Pham
*Assistant Examiner*—Phuc Tran

(57) ABSTRACT

A wireless network according to the present invention includes a plurality of nodes that transmit and receive radio frequency (RF) signals. An access point broadcasts and receives radio frequency (RF) signals, wirelessly communicates with the plurality of nodes, generates a table containing a list nodes operating in the wireless network, and broadcasts the table to the plurality of nodes. The access point also calculates traffic conditions. A first node receives the table determines a hidden status of a second node in the table. The first node communicates directly with the second node if the second node has a not hidden status and communicates with the second node through the access point if the second node has a hidden status.

77 Claims, 7 Drawing Sheets

APPARATUS FOR DETECTING HIDDEN NODES IN A WIRELESS NETWORK

FIELD OF THE INVENTION

The present invention relates to wireless networks, and more particularly to wireless communications between nodes in a wireless network.

BACKGROUND OF THE INVENTION

Referring now to FIG. 1, a typical wireless network 10 is shown. The wireless network 10 includes an access point 12, a plurality of wireless nodes 14-1, 14-2, . . . , and 14-n, and an external network 18. A communications link 20 connects the access point 12 to the external network 18. In the wireless network 10, the wireless nodes 14 communicate with each other and/or with the external network 18 through the access point 12.

For example, when the node 14-1 wants to communicate with the node 14-2, the node 14-1 sends a message to the access point 12. The access point 12 retransmits the message to the node 14-2. The node 14-2 sends a response to the access point 12, which retransmits the response to the node 14-1.

The access point 12 maintains a table including a current list of nodes 14 that are operating in the wireless network 10. The table also includes media access control (MAC) and Internet protocol (IP) addresses and an active/inactive status of each node 14. The access point 12 transmits the table to the nodes 14 when new nodes 14 are added or when other changes to the table occur. All of the nodes 14 are located relative to the access point 12 to allow communications with the access point 12. As described above, the nodes 14 of the wireless network 10 do not directly communicate with other nodes 14. In other words, the packet transmitted by a node must be retransmitted by the access point, which ineffectively uses available bandwidth and reduces throughput.

SUMMARY OF THE INVENTION

A wireless network according to the present invention includes a plurality of nodes that transmit and receive radio frequency (RF) signals. An access point transmits and receives radio frequency (RF) signals and wirelessly communicates with the plurality of nodes. The access point generates a table containing a list of nodes operating in the wireless network and transmits the table to the nodes. A first node receives the table and determines a hidden status of a second node in the table.

In still other features, the first node communicates directly with the second node if the second node has a not hidden status and communicates with the second node through the access point if the second node has a hidden status.

In yet other features, the first node determines the hidden status of other nodes in the table when the access point sends a new table. The first node broadcasts an acknowledgement request to the other nodes in the wireless network when the new table is received. The first node sets the hidden status of the other nodes equal to hidden if a response to the acknowledgement is not received within a predetermined period. The first node sets the hidden status of the other nodes equal to not hidden if a response to the acknowledgement is received within the predetermined period.

In still other features, the first node updates the hidden status of a third node if the first node receives a signal from the third node. The first node includes an aging timer for other nodes in the table. The first node updates the hidden status of the other nodes if the aging timer of the other node expires.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
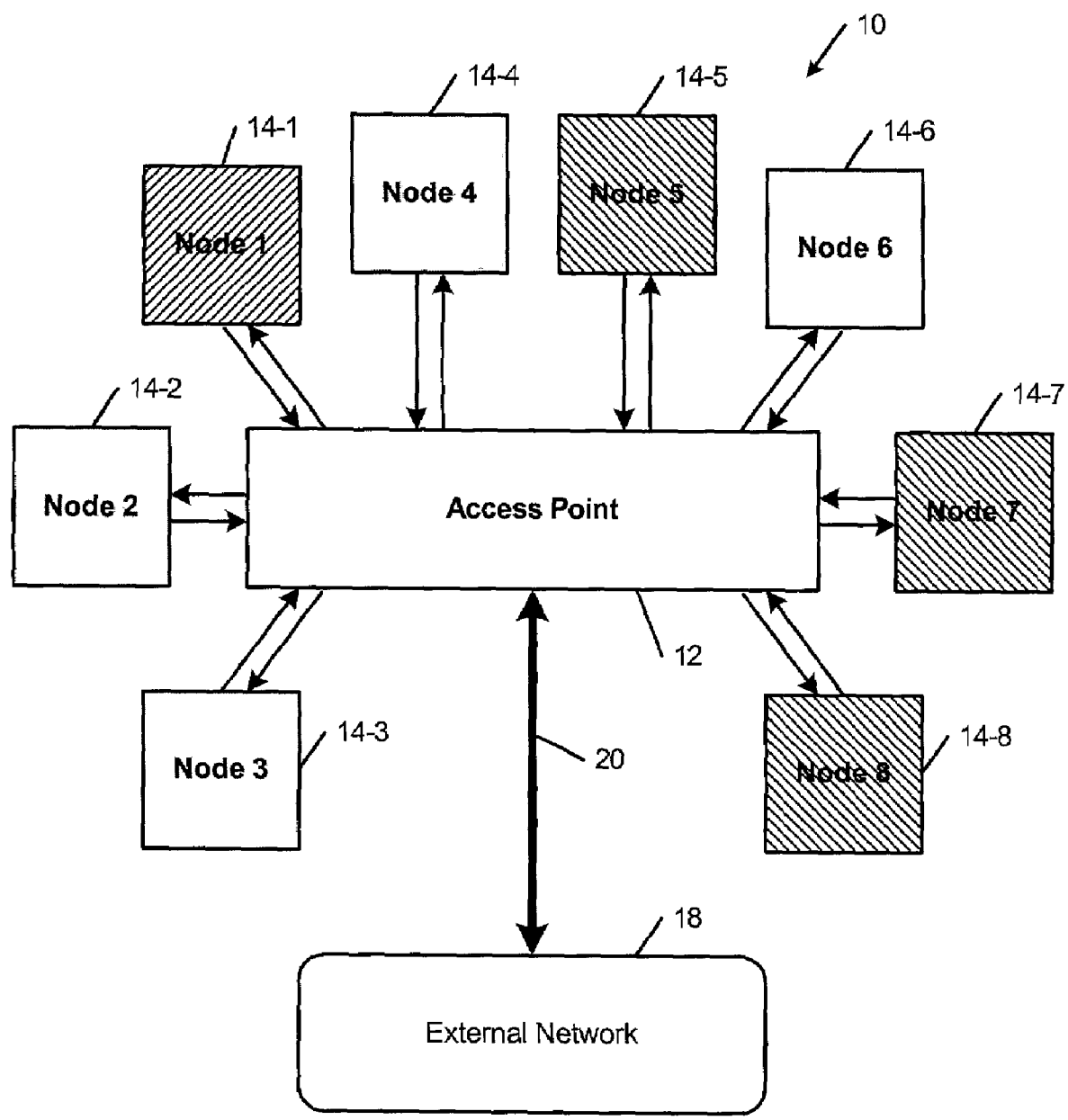
FIG. 1 is a functional block diagram of a wireless network according to the prior art.

In the conventional wireless network 10 of FIG. 1, the sending node 14 does not directly communicate with the receiving node 14 in the wireless network 10. In other words, the transmitted packet from the sending node 14 must be retransmitted by the access point 12, which ineffectively uses available bandwidth and reduces throughput.

A first node is "hidden" from a second node in a wireless network if both nodes operate in the same wireless network 10 but the second node cannot receive transmissions from the first node. When the first node 14 is hidden from the second node 14, there is no possibility that the first node 14 can directly communicate with the second node 14. Therefore, the access point 12 must be used. The receiving node 14 may, however, be capable of directly receiving transmissions from the sending node 14. In this situation, the nodes are not hidden and communications between the nodes 14 can be made directly if modifications are made to the wireless network 10 in accordance with the present invention. In this situation, the second transmission between the access point 12 and the receiving node 14 is redundant.

In the exemplary wireless network of FIG. 1, the node 14-1 is capable of receiving transmissions from the nodes 14-2, 14-3, 14-4, and 14-6. In other words, the nodes 14-2, 14-3, 14-4, and 14-6 are not hidden from the node 14-1. On the other hand, the first node 14-1 cannot receive transmissions from the nodes 14-5, 14-7 and 14-8. The nodes 14-5, 14-7 and 14-8 are hidden from node 14-1. Nodes 14 that are not hidden from each other have the potential to directly communicate with one another. In the conventional wireless network 10, however, nodes 14 that are not hidden from each other cannot directly communicate without the access point 12. The nodes 14 do not know the hidden status of the other nodes 14 in the wireless network 10.

Figure 2:
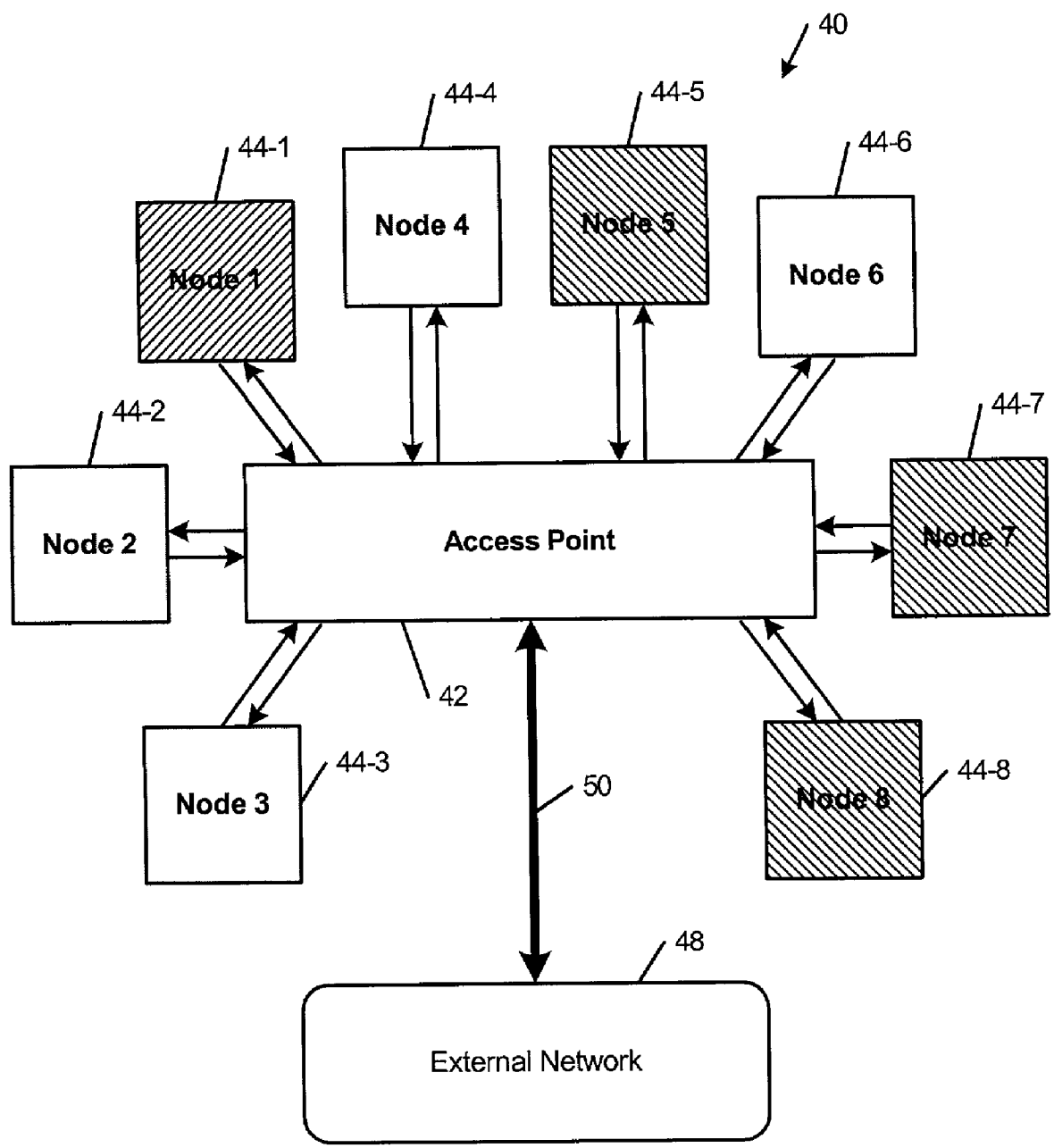
FIG. 2 is a functional block diagram of a wireless network according to the present invention.

Referring now to FIG. 2, a wireless network 40 according to the present invention is shown. The wireless network 40 includes an access point 42, a plurality of wireless nodes 44-1, 44-2, . . . , and 44-n, and an external network 48. The nodes 44 communicate with the access point 12 via radio frequency (RF) signals. A communications link 50 connects the access point 42 to the external network 48. The communications link 50 may be a wired connection (such as category 5 cable), a wireless connection (using RF signals), an optical link using fiber optic cable, and/or any other suitable communications link.

In the wireless network 40, the wireless nodes 44 are capable of communicating in a conventional manner with each other through the access point 42 and/or with the external network 48 through the access point 42. More specifically, when the node 44-1 communicates with the node 44-2, the nodes 44-1 sends a message to the access point 42. The access point 42 retransmits the message to the node 44-2. The node 44-2 sends a response to the access point 42, which retransmits the response to the node 44-1. The access point 42 maintains a table including an up-to-date list of all nodes 44 that are operating in the wireless network 40. The table includes the media access control (MAC) and Internet protocol (IP) addresses of the nodes 44. The table also includes the active/inactive status of each node 44.

In addition to the conventional communications through the access point 42, two nodes 44 that are not hidden from each other may communicate directly without the access point 42. To accomplish direct communications, the nodes 44 determine the hidden status of other nodes in the wireless network 40 as will be described further below.

During initialization or at other times such as during an idle period, the access point 42 broadcasts a table containing a list of active nodes 44 that are present in the wireless network 40. The table also contains the media access control (MAC) and Internet protocol (IP) addresses for all of the nodes 44 in the wireless network 40. The access point 42 broadcast the table to all nodes 44 whenever there is a change to the table. Possible changes include additions or deletions of nodes 44 to/from the table and changes to the MAC or IP addresses of any node 44 in the table. Upon receiving the table, the nodes 44 generate a random backoff number. The random backoff number is used by the node 44 as a time delay for retransmission to reduce collisions.

Figure 3:
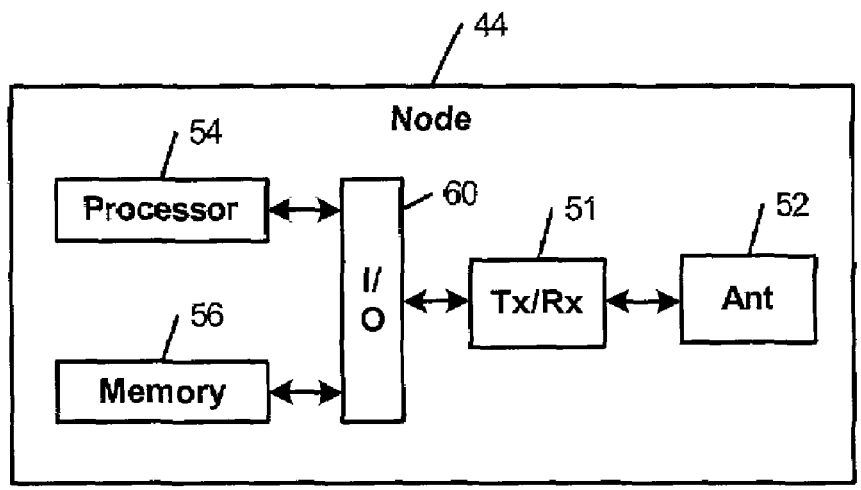
FIG. 3 is a functional block diagram of a node according to the present invention.

Referring now to FIG. 3, the nodes 44 are shown in further detail. The nodes 44 include a transmitter and a receiver that are collectively identified at 51 and one or more antennas 52. The nodes 44 further include a processor 54 that executes software, memory 56 such as read-only memory, random access memory, flash memory, or other suitable electronic storage, and an input/output (I/O) interface 60. The nodes may also be discrete circuits, application specific integrated circuits or any other suitable electronic circuit.

Figure 4:
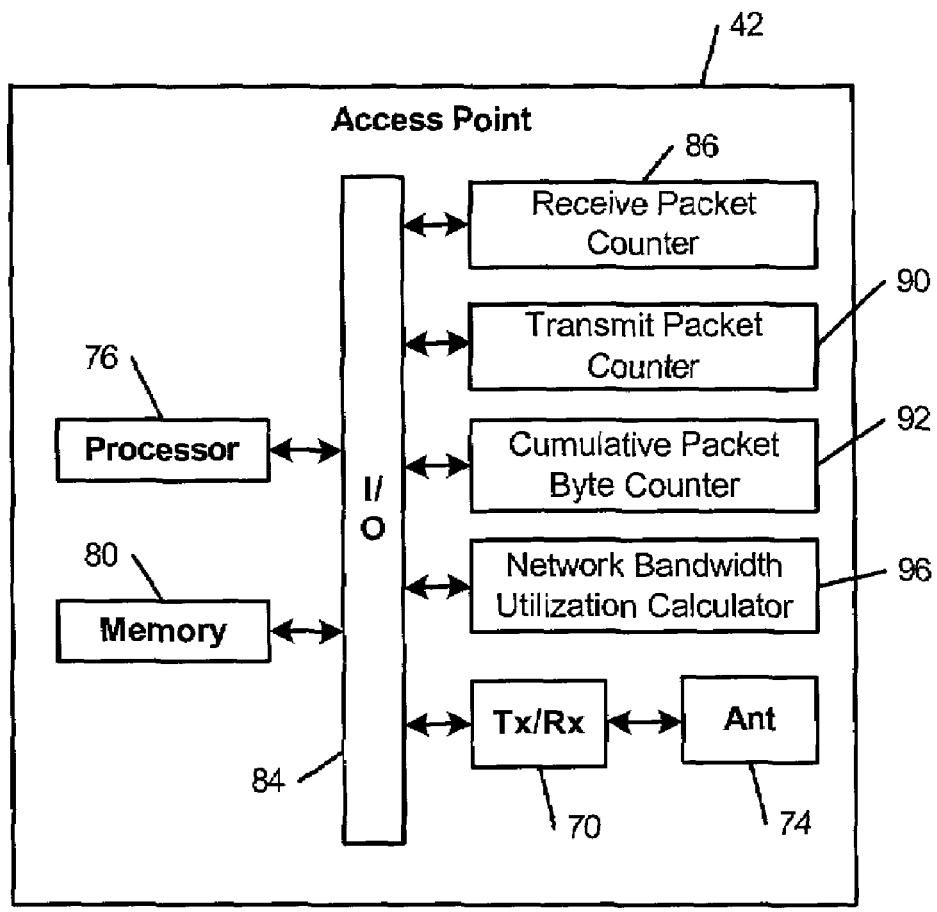
FIG. 4 is a functional block diagram of an access point according to the present invention.

Referring now to FIG. 4, the access point 42 is shown in further detail. The access point 42 includes one or more transmitters and receivers that are collectively identified at 70 and one or more antennas 74. The access point 42 further includes a processor 76 that executes software, memory 80 such as read-only memory, random access memory, flash memory, or other suitable electronic storage, and an I/O interface 84. The access point 42 may be an application specific integrated circuit, a discrete circuit or any other electronic circuit. The access point 42 further includes a receive packet counter 86, a transmit packet counter 90, and a cumulative packet byte counter 92. A network bandwidth utilization calculator 96 communicates with one or more of the counters 86, 90 and 92 to generate a bandwidth utilization calculation or estimate. The access point 42 transmits the network bandwidth utilization calculations to the nodes of the wireless network 40.

Figure 5:
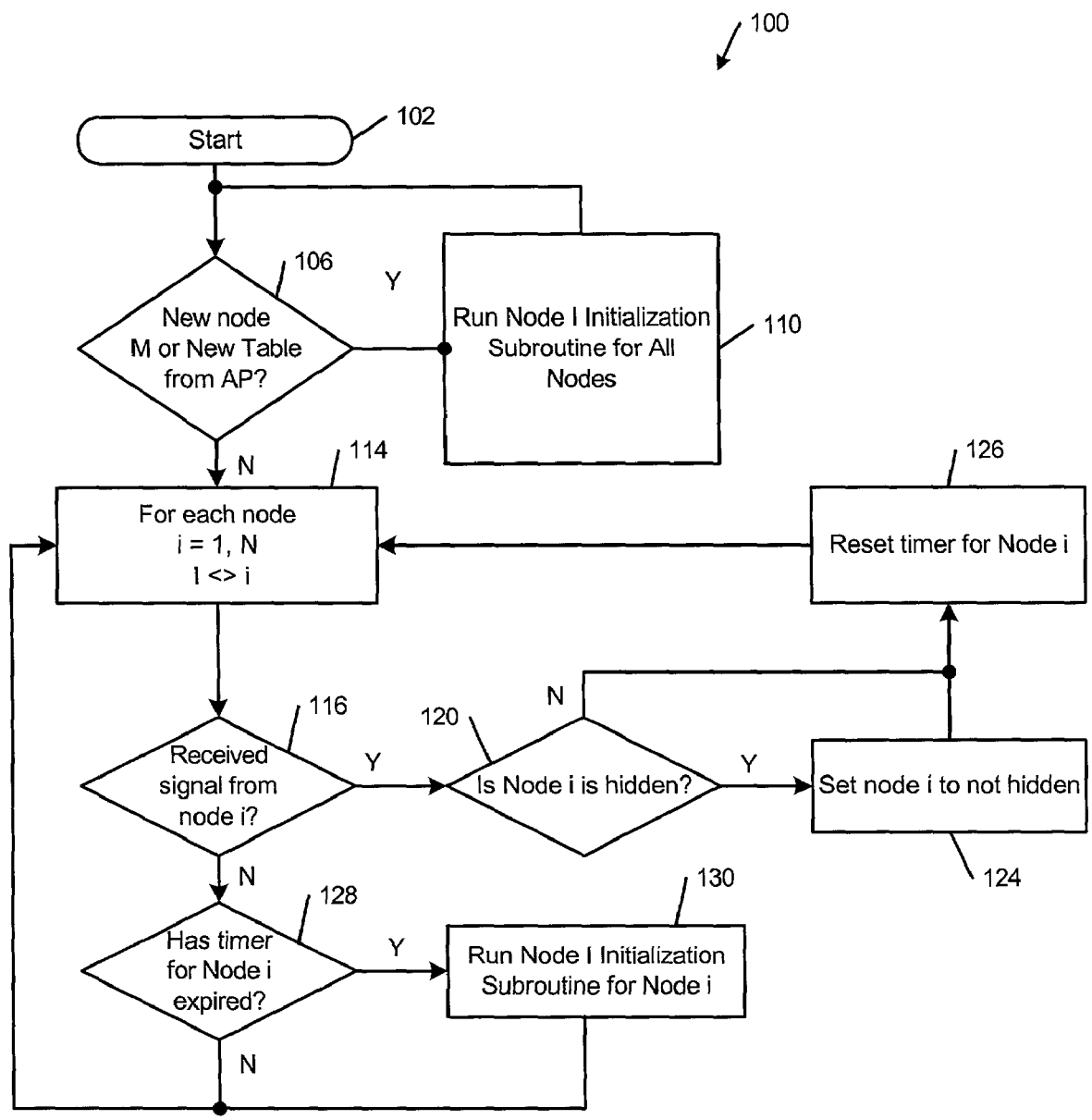
FIG. 5 is a flowchart illustrating steps of a method for operating the wireless network according to the present invention.

Referring now to FIG. 5, steps for controlling the wireless network 40 are generally identified at 100. Control begins with step 102. In step 106, the nodes 44 determine whether there is a new node or a new table available from the access point 42. If there is, control continues with step 110 and executes a node initialization subroutine for all nodes. The node initialization subroutine of step 110 is illustrated further in conjunction with FIG. 6. The node initialization subroutine determines the hidden status of other nodes 44 in the wireless network 40 with respect to a given node 44.

A node 44 may move from the original location to a new location within the wireless network 40. The move, however, will not change the table that is maintained by the access point 42 or stored by the nodes 44. To address this condition, each node 44 assigns an aging factor to the hidden and unhidden nodes on its table. If the aging factor associated with a node expires, the source node 44 sends a new inquiry to the aged node 44 to update the hidden status of the aged node 44.

In step 114, a loop is initiated by the source node 1. In step 116, the source node I determines whether it has received a signal from the node i. If the source node I receives a signal from node i, control continues with step 120. In step 120, the source node I determines whether the node i is hidden. If the node i is hidden, the source node I sets the node i to not hidden in step 124 and continues with step 126. Otherwise, control continues from step 120 directly to step 126. In step 126, the source node resets an aging timer for node i. Control continues from step 126 back to step 114. Steps are repeated by the source node I for other nodes in the wireless network 40.

If a signal is not received from node i, the source node I determines whether the aging timer for node i has expired in step 128. If not, control loops back to step 114. Otherwise, if the aging timer has expired, the source node I performs the node I initialization subroutine for node i in step 130.

Figure 6:
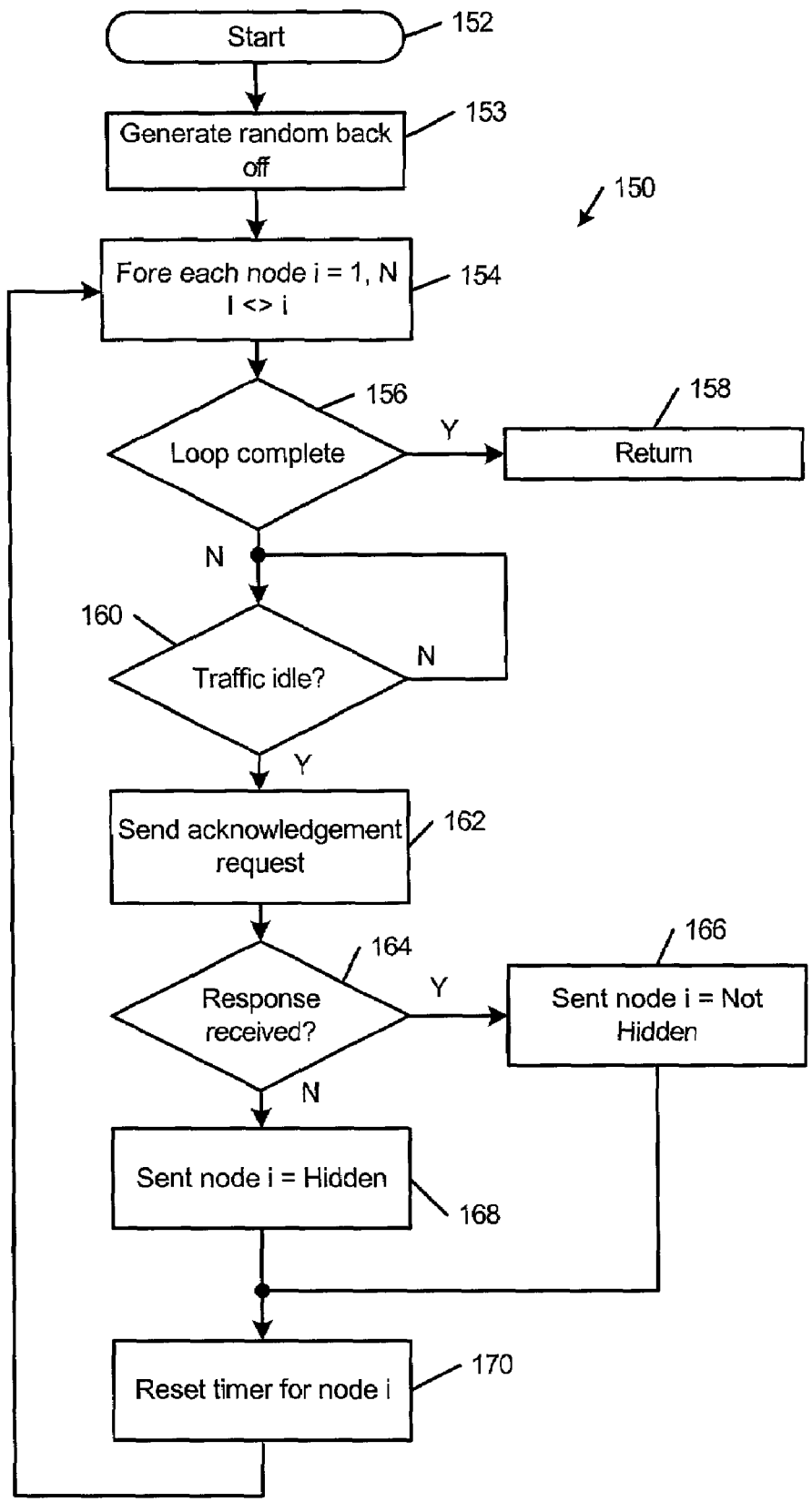
FIG. 6 is a flowchart illustrating steps for initializing nodes according to the present invention.

Referring now to FIG. 6, the node I initialization subroutine is shown generally at 150. Control begins with step 152. In step 153, the nodes 44 generate random backoff numbers, which are used by the nodes 44 as a time delay for retransmission when the nodes 44 detect a collision. In step 154, the source node I begins a loop. In step 156, the source node I determines whether the loop of step 154 is complete. If it is, control returns to the method of FIG. 5 in step 158. Otherwise, the source node I determines whether traffic is idle in step 160. If not, control loops back to step 150 until traffic is idle. Otherwise, the source node I sends an acknowledgment request in step 162. In a preferred embodiment, the acknowledgement request is an address resolution protocol (ARP) packet. In step 164, the source node I determines whether a response has been received. If a response has been received, control continues with step 166 where the hidden status of node i is set equal to not hidden. If no response is received, control continues with step 168 where the status of the node i is set equal to hidden. Control continues from steps 166 and one 168 to step 170 where the aging timer for node I is reset.

To minimize the impact of the present invention on the performance of the wireless network 40, the messages are preferably sent out during idle traffic periods. The access point 42 identifies the idle periods. The access point 42 includes the receive and transmitter packet counters 86 and 90 and a cumulative packet byte counter 92. The access point 42 calculates the utilization of network bandwidth and conveys this information to all of the nodes 44. Preferably, the network utilization is transmitted during idle periods. The idle periods are preferably defined as utilization of less than 10 percent.

In the conventional wireless network 10, if the first node 14-1 communicates with the second node 14-2, the first node 14-1 transmits the message through the access point 12 to the second node 14-2. As can be appreciated, each message is transmitted by both the first node 14-1 and the access point 12. The nodes 14-1 and 14-2 do not know which of the other nodes 14 are hidden or not hidden.

Figure 7:
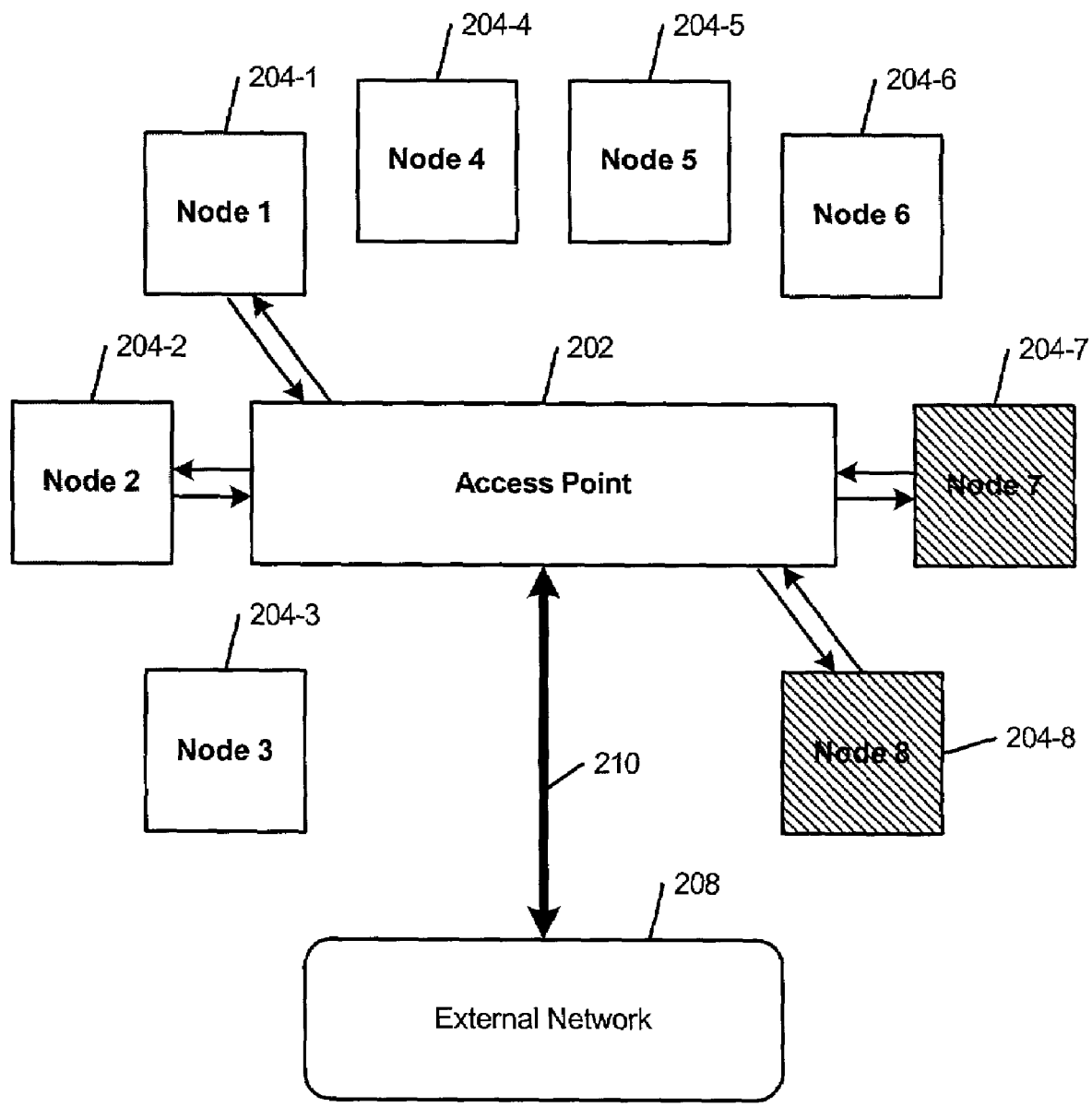
FIG. 7 is a functional block diagram of a wireless network according to the present invention.

Referring now to FIG. 7, nodes 204-1 and 204-2 in the exemplary wireless network 200 of the present invention are hidden from nodes 204-7 and 204-8. The nodes 204 in the wireless network 200 know the hidden status of other nodes. Therefore, node 204-1 can directly communicate with node 204-2 without the intermediary of the access point 202. Likewise, node 204-7 can directly communicate with node 204-8 without the intermediary of the access point 202. Since the nodes 204-1 and 204-2 are hidden from the nodes 204-7 and 204-8, the communication of nodes 204-1 and 204-2 can be conducted simultaneously with the communication of nodes 204-7 and 204-8. As can be appreciated, the present invention reduces redundant traffic on the wireless network 200 by at least 50 percent, which effectively doubles throughput. A node 204 is only required to communicate through the access point 202 if the node 204 is communicating with a hidden node 204 or with the external network 208. The bandwidth utilization factor is preferably stored and/or displayed in real time on each of the nodes 204 to allow a user to troubleshoot or perform routine maintenance of the wireless network 200.

Figure 8:
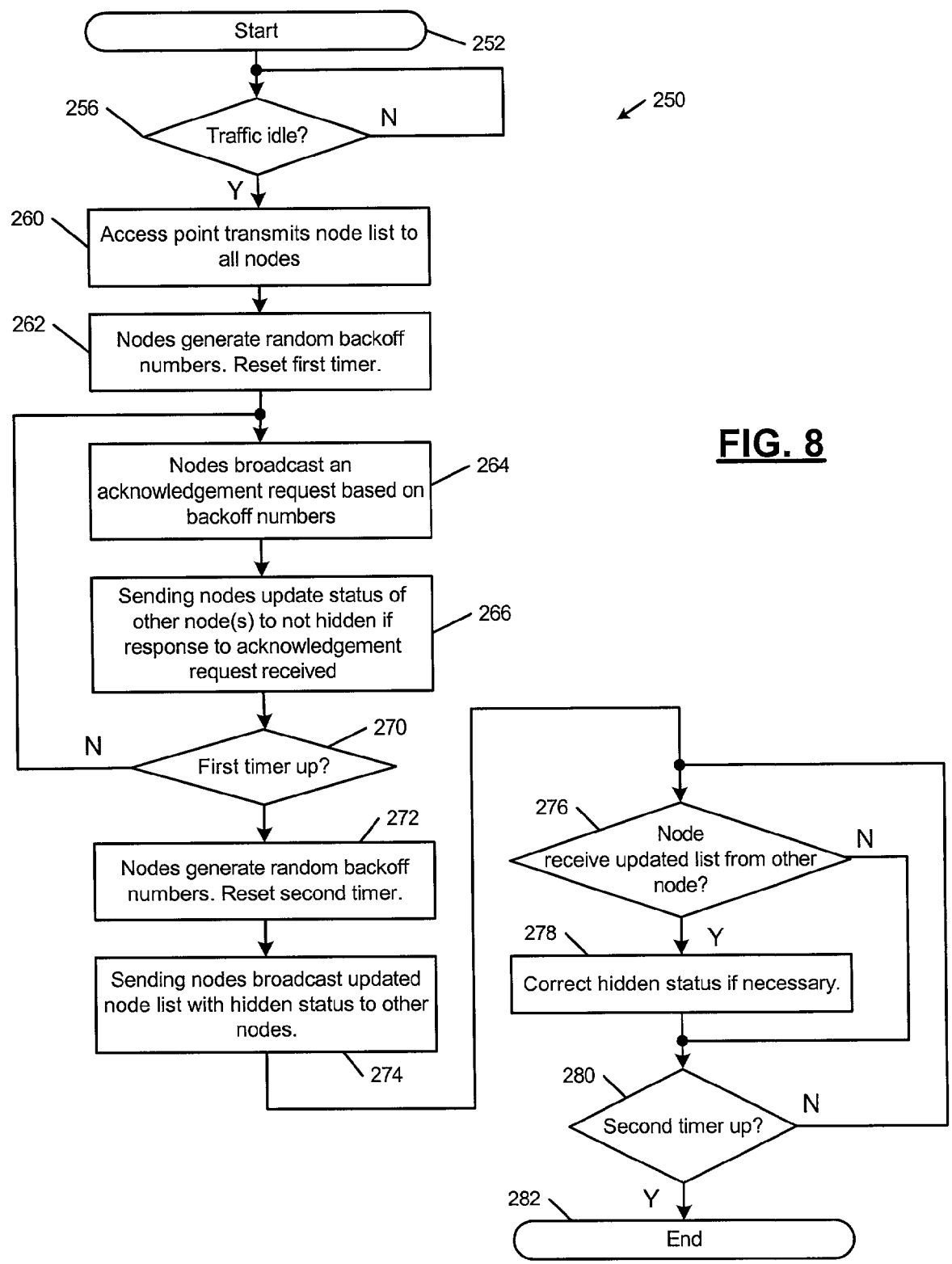
FIG. 8 is a flowchart illustrating steps of an alternate method for operating the wireless network according to the present invention.

Referring now to FIG. 8, an alternate method for operating the wireless network according to the present invention is shown generally at 250. The alternate method provides the functionality of the method set forth above in FIGS. 5 and 6. In addition, the alternate method handles situations where a first node of the wireless network is capable of receiving broadcasts from a second node in the wireless network but the second node is not capable of receiving broadcasts from the first node. In this situation, the first node is hidden with respect to the second node and the second node is not hidden with respect to the first node. In other words, the hidden status of these nodes is not a mirror image.

In step 252, control begins. In step 256, the access point determines whether traffic is idle. If not, control loops back to step 256. When traffic is idle as determined in step 256, the access point transmits a node list to all of the nodes in the wireless network in step 260. In step 262, random backoff numbers are generated by each node. A first timer in each node is reset. Based on the backoff number, the nodes broadcast an acknowledgement request in step 264. For example, a node having the lowest (or highest) backoff number broadcasts first followed by a node having the next lowest (or highest) backoff number. Still other ways of staging the nodes using the random backoff number or other suitable methods will be apparent to skilled artisans.

In step 264, each sending node sends an acknowledgment request to other nodes in the wireless network. In step 266, the sending node sets a hidden status of other nodes equal to not hidden if a response to the acknowledgment request is received by the sending node. In step 270, control determines whether the first timer is up. If not, control loops back to step 264. Otherwise, control continues with step 272 where each node generates a random backoff number. A second timer in each node is reset. In step 274, the sending nodes broadcast an updated node list including the hidden status of the other nodes relative to be sending node.

In step 276, the nodes determine whether an updated list has been received from another node. If an updated list is received, control continues with step 278 wherein the hidden status of the node is updated if necessary. Otherwise, control continues with step 280 and determines whether the second timer is up. If not, control loops to step 276. Otherwise control ends in step 282.

For example, a wireless network includes first, second and third nodes. The access point broadcasts a list containing the first, second and third nodes. The third node generates the lowest backoff number and broadcasts the acknowledgement request. The third node receives a response from the first node but not the second. The second node has the next highest backoff number and broadcasts the acknowledgement request. The second node receives a response from the first node but not the third node. The first node has the highest backoff number and broadcasts the acknowledgement request. The first node receives a response from the third node but not the second node.

The first node generates a first list including the second node (hidden) and the third node (not hidden). The second node generates a second list including the first node (not hidden) and the third node (hidden). The third node generates a third list including the first node (not hidden) and the second node (hidden).

The nodes generate a second random backoff number. The second node has the lowest second backoff number. The second node broadcasts the second list. The first node receives the second list and compares the second list to the first list. The hidden status of the second node on the first list is hidden. The hidden status of the second node on the second list is not hidden. Therefore, the hidden status of the second node on the first list is not changed.

The first node has the next lowest second backoff number. The first node broadcasts the first list. The second node receives the first list and compares the first list to the second list. The hidden status of the first node on the second list is not hidden. The hidden status of the first node on the first list is hidden. Therefore, the hidden status of the first node on the second list is changed from not hidden to hidden. The third node is handled in a similar manner. As can be appreciated, the alternate method ensures that the hidden status of the nodes are mirror images.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A wireless network comprising:
a plurality of nodes that transmit and receive radio frequency (RF) signals; and an access point that transmits and receives radio frequency (RF) signals, that wirelessly communicates with said plurality of nodes, that generates a table containing a list of nodes operating in said wireless network, and that broadcasts said table to said plurality of nodes, wherein a first node of said plurality of nodes receives said table and determines a hidden status of a second node in said table and said first node generates a backoff number.

2. The wireless network of claim 1 wherein said first node communicates directly with said second node if said second node has a not hidden status and communicates with said second node through said access point if said second node has a hidden status.

3. The wireless network of claim 2 wherein said second node communicates directly with said first node if said first node has a not hidden status and communicates with said first node through said access point if said first node has a hidden status.

4. The wireless network of claim 1 wherein said first node determines said hidden status for other nodes in said table when said access point sends a new table.

5. The wireless network of claim 1 wherein said first node updates said hidden status of a third node if said first node receives a signal from said third node.

6. The wireless network of claim 1 wherein said first node includes an aging timer for other nodes in said table and wherein said first node updates said hidden status of one of said other nodes if said aging timer of said other node expires.

7. The wireless network of claim 1 wherein said access point further includes a transmit packet counter that counts transmit packets generated by said access point.

8. The wireless network of claim 7 wherein said access point further includes a receive packet counter that counts receive packets received by said access point.

9. The wireless network of claim 8 wherein said access point further includes a cumulative packet byte counter.

10. The wireless network of claim 9 wherein said access point includes a network bandwidth utilization calculator.

11. The wireless network of claim 1 wherein said table generated by said access point further includes at least one address for each of said plurality of nodes and an active/inactive status of each of said plurality of nodes.

12. A wireless network comprising:

a plurality of nodes that transmit and receive radio frequency (RF) signals; and an access point that transmits and receives radio frequency (RF) signals, that wirelessly communicates with said plurality of nodes, that generates a table containing a list of nodes operating in said wireless network, and that broadcasts said table to said plurality of nodes, wherein a first node of said plurality of nodes receives said table and determines a hidden status of a second node in said table, said first node determines said hidden status for other nodes in said table when said access point sends a new table, and said first node broadcasts an acknowledgement request to said other nodes in said wireless network when said new table is received.

13. The wireless network of claim 12 wherein said first node sets said hidden status of said other nodes equal to hidden if a response to said acknowledgement request is not received within a predetermined period and sets said hidden status of said other nodes equal to not hidden if a response to said acknowledgement is received within said predetermined period.

14. The wireless network of claim 12 wherein said acknowledgement request is sent during idle periods.

15. A wireless network comprising:

a plurality of nodes that transmit and receive radio frequency (RF) signals; and an access point that transmits and receives radio frequency (RF) signals, that wirelessly communicates with said plurality of nodes, that generates a table containing a list of nodes operating in said wireless network, and that broadcasts said table to said plurality of nodes, wherein a first node of said plurality of nodes receives said table and determines a hidden status of a second node in said table, said second node determines a hidden status of said first node and generates a second list, and said first node broadcasts a first list containing said second node and said hidden status of said second node to said second node.

16. The wireless network of claim 15 wherein said second node compares said hidden status of said second node on said first list to said hidden status of said first node on said second list.

17. The wireless network of claim 16 wherein said second node sets said hidden status of said first node on said second list equal to hidden if said hidden status of said first node on said second list is not hidden and said hidden status of said second node on said first list is equal to hidden.

18. A method for operating a wireless network comprising:

transmitting and receiving radio frequency (RF) signals using a plurality of nodes;

wirelessly communicating with said plurality of nodes using an access point;

generating a table containing a list of nodes operating in said wireless network using said access point;

transmitting said table to said plurality of nodes;

receiving said table at a first node; and determining a hidden status of a second node in said table using said first node, wherein said first node generates a backoff number.

19. The method of claim 18 wherein said first node communicates directly between with said second node if said second node has a not hidden status and communicates with said second node through said access point if said second node has a hidden status.

20. The method of claim 19 wherein said second node communicates directly with said first node if said first node has a not hidden status and communicates with said first node through said access point if said first node has a hidden status.

21. The method of claim 18 further comprising determining said hidden status for other nodes in said table using said first node when said access point sends a new table to said first node.

22. The method of claim 18 further comprising updating said hidden status of a third node if said first node receives a signal from said third node.

23. The method of claim 18 further comprising providing an aging timer that is associated with said first node for other nodes in said table.

24. The method of claim 23 further comprising updating said hidden status of one of said other nodes if said aging timer of said other node expires.

25. The method of claim 18 further comprising counting transmit packets generated by said access point.

26. The method of claim 25 further comprising counting receive packets received by said access point.

27. The method of claim 26 further comprising calculating network bandwidth utilization.

28. The method of claim 18 wherein said table generated by said access point further includes at least one address for each of said plurality of nodes and an active/inactive status of each of said plurality of nodes.

29. A method for operating a wireless network comprising:
transmitting and receiving radio frequency (RF) signals using a plurality of nodes;
wirelessly communicating with said plurality of nodes using an access point;
generating a table containing a list of nodes operating in said wireless network using said access point;
transmitting said table to said plurality of nodes;
receiving said table at a first node;
determining a hidden status of a second node in said table using said first node; and
determining said hidden status for other nodes in said table using said first node when said access point sends a new table to said first node,
wherein said first node broadcasts an acknowledgement request to said other nodes in said wireless network when said new table is received.

30. The method of claim 29 further comprising:
setting said hidden status of said other nodes equal to hidden if a response to said acknowledgement request is not received within a predetermined period; and
setting said hidden status of said other nodes equal to not hidden if a response to said acknowledgement is received within said predetermined period.

31. The method of claim 29 wherein said acknowledgement request is sent during idle periods.

32. A method for operating a wireless network comprising:
transmitting and receiving radio frequency (RF) signals using a plurality of nodes;
wirelessly communicating with said plurality of nodes using an access point;
generating a table containing a list of nodes operating in said wireless network using said access point;
transmitting said table to said plurality of nodes;
receiving said table at a first node;
determining a hidden status of a second node in said table using said first node;
determining a hidden status of said first node using said second node;
using said first node, generating a first list containing said second node and said hidden status of said second node;
using said second node, generating a second list containing said first node and said hidden status of said first node; and
broadcasting said first list using said first node.

33. The method of claim 32 further comprising:
using said second node, comparing said hidden status of said second node on said first list to said hidden status of said first node on said second list.

34. The method of claim 33 further comprising:
using said second node, setting said hidden status of said first node equal to hidden if said hidden status of said first node on said second list is not hidden and said hidden status of said second node on said first list is equal to hidden.

35. A wireless network comprising:
a plurality of nodes that transmit and receive radio frequency (RF) signals;
access means for transmitting and receiving radio frequency (RF) signals, for wirelessly communicating with said plurality of nodes, for generating a table containing a list nodes operating in said wireless network, and for broadcasting said table to said plurality of nodes; and
first hidden status means, associated with a first node, for receiving said table and for determining a hidden status of a second node in said table,
wherein said first node further includes generating means for generating a random backoff number.

36. The wireless network of claim 35 wherein said first node directly communicates with said second node if said second node has a not hidden status and communicates with said second node through said access point if said second node has a hidden status.

37. The wireless network of claim 35 wherein said first hidden status means of said first node determines said hidden status for other nodes in said table when said access point sends a new table.

38. The wireless network of claim 35 further comprising update means associated with said first hidden status means for updating said hidden status of a third node if said first node receives a signal from said third node.

39. The wireless network of claim 35 further comprising timing means associated with said first hidden status means for periodically updating said hidden status of at least one of said other nodes.

40. The wireless network of claim 35 wherein said access point further includes transmit packet counting means for counting transmit packets generated by said access point.

41. The wireless network of claim 40 wherein said access point further includes receive packet counting means for counting receive packets received by said access point.

42. The wireless network of claim 41 wherein said access point further includes cumulative packet byte counting means for counting cumulative packets.

43. The wireless network of claim 42 wherein said access point includes utilization calculating means for calculating network bandwidth utilization.

44. The wireless network of claim 35 wherein said table generated by said access point further includes at least one address for each of said plurality of nodes and an active/inactive status of each of said plurality of nodes.

45. A wireless network comprising:
a plurality of nodes that transmit and receive radio frequency (RF) signals;
access means for transmitting and receiving radio frequency (RF) signals, for wirelessly communicating with said plurality of nodes, for generating a table containing a list nodes operating in said wireless network, and for broadcasting said table to said plurality of nodes;
first hidden status means, associated with a first node, for receiving said table and for determining a hidden status of a second node in said table, wherein said first hidden status means of said first node determines said hidden status for other nodes in said table when said access point sends a new table; and acknowledgement means associated with said first node for broadcasting an acknowledgement request to said other nodes in said wireless network when said new table is received.

46. The wireless network of claim 45 wherein said first hidden status generating means sets said hidden status of said other nodes equal to hidden if a response to said acknowledgement request is not received within a predetermined period and sets said hidden status of said other nodes equal to not hidden if a response to said acknowledgement is received within said predetermined period.

47. The wireless network of claim 45 wherein said acknowledgement request is sent during idle periods.

48. A wireless network comprising:
a plurality of nodes that transmit and receive radio frequency (RF) signals;
access means for transmitting and receiving radio frequency (RF) signals, for wirelessly communicating with said plurality of nodes, for generating a table containing a list nodes operating in said wireless network, and for broadcasting said table to said plurality of nodes;
first hidden status means, associated with a first node, for receiving said table and for determining a hidden status of a second node in said table; and
second hidden status generating means associated with said second node for determining a hidden status of said first node, wherein said first hidden status generating means of said first node broadcasts a first list containing said second node and said hidden status of said second node to said second node.

49. The wireless network of claim 48 wherein said second hidden status generating means of said second node compares said hidden status of said second node on said first list to said hidden status of said first node on said second list.

50. The wireless network of claim 49 wherein said second hidden status generating means of said second node sets said hidden status of said first node equal to hidden if said hidden status of said first node on said second list is not hidden and said hidden status of said second node on said first list is equal to hidden.

51. A node in a wireless network comprising:
a transmitter of radio frequency (RF) signals;
a receiver of RF signals; and
a hidden status generator that communicates with said transmitter and said receiver, that receives a table containing a list nodes that are operating in said wireless network and that determines a hidden status of a second node in said table, wherein said node includes a random backoff number generator.

52. The node of claim 51 wherein said node communicates directly with said second node if said second node has a not hidden status and communicates with said second node through an access point if said second node has a hidden status.

53. The node of claim 51 wherein said node determines said hidden status of other nodes in said table when an access point sends a new table.

54. The node of claim 51 wherein said node updates said hidden status of a third node if said node receives a signal from said third node.

55. The node of claim 51 further comprising an aging timer for other nodes in said table and wherein said node updates said hidden status of said other nodes if said aging timer for said other node expires.

56. The node of claim 51 wherein said node broadcasts a first list containing said second node and said hidden status of said second node.

57. A node in a wireless network comprising:
a transmitter of radio frequency (RF) signals;
a receiver of RF signals; and
a hidden status generator that communicates with said transmitter and said receiver, that receives a table containing a list nodes that are operating in said wireless network and that determines a hidden status of a second node in said table,
wherein said node determines said hidden status of other nodes in said table when an access point sends a new table and said node broadcasts an acknowledgement request to said other nodes in said wireless network when said new table is received.

58. The node of claim 57 wherein said node sets said hidden status of said other nodes equal to hidden if a response to said acknowledgement request is not received within a predetermined period and sets said hidden status of said other nodes equal to not hidden if a response to said acknowledgement is received within said predetermined period.

59. The node of claim 57 wherein said acknowledgement request is sent during idle periods.

60. A node in a wireless network comprising:
transmitting means for transmitting radio frequency (RF) signals;
receiving means for receiving RF signals;
hidden status generating means that communicates with said transmitting and receiving means for receiving a table containing a list nodes that are operating in said wireless network and for determining a hidden status of a second node in said table; and
random number generating means that communicates with said hidden status generating means for generating a random backoff number.

61. The node of claim 50 wherein said node communicates directly with said second node if said second node has a not hidden status and communicates with said second node through an access point if said second node has a hidden status.

62. The node of claim 50 wherein said hidden status generating means determines said hidden status of other nodes in said table when an access point sends a new table.

63. The node of claim 50 wherein said hidden status generating means updates said hidden status of a third node if said node receives a signal from said third node.

64. The first node of claim 50 further comprising timing means associated with said hidden status generating means for periodically updating said hidden status of at least one of said other nodes.

65. The node of claim 50 wherein said hidden status generating means broadcasts a first list containing said second node and said hidden status of said second node.

66. A node in a wireless network comprising:
transmitting means for transmitting radio frequency (RF) signals;
receiving means for receiving RF signals; and
hidden status generating means that communicates with said transmitting and receiving means for receiving a table containing a list nodes that are operating in said wireless network and for determining a hidden status of a second node in said table,
wherein said hidden status generating means determines said hidden status of other nodes in said table when an access point sends a new table and said hidden status generating means broadcasts an acknowledgement request to said other nodes in said wireless network when said new table is received.

67. The node of claim 66 wherein said hidden status generating means sets said hidden status of said other nodes equal to hidden if a response to said acknowledgement request is not received within a predetermined period and sets said hidden status of said other nodes equal to not hidden if a response to said acknowledgement is received within said predetermined period.

68. The node of claim 66 wherein said acknowledgement request is sent during idle periods.

69. A method for operating a node in a wireless network comprising:

receiving a table containing a list of nodes that are operating in said wireless network;

determining a hidden status of a first node in said table; and generating a random backoff number based on said table; and delaying transmission of data from one of said nodes based on said random backoff number.

70. The method of claim 69 further comprising:

communicating directly with said second node if said second node has a not hidden status; and communicating with said second node through an access point if said second node has a hidden status.

71. The method of claim 69 further comprising determining said hidden status for other nodes in said table when an access point sends a new table.

72. The method of claim 69 further comprising updating said hidden status of a second node if said node receives a signal from said second node.

73. The method of claim 69 further comprising periodically updating said hidden status of one of said other nodes.

74. The method of claim 69 further comprising broadcasting a first list containing said first node and said hidden status of said first node.

75. A method for operating a node in a wireless network comprising:

receiving a table containing a list nodes that are operating in said wireless network;

determining a hidden status of a first node in said table;

determining said hidden status for other nodes in said table when an access point sends a new table; and broadcasting an acknowledgement request to said other nodes in said wireless network when said new table is received.

76. The method of claim 75 further comprising:

setting said hidden status of said other nodes equal to hidden if a response to said acknowledgement request is not received within a predetermined period; and setting said hidden status of said other nodes equal to not hidden if a response to said acknowledgement is received within said predetermined period.

77. The method of claim 75 further comprising broadcasting said acknowledgement request during idle periods.

* * * * *

UNITED STATES PATENT AND TRADEMARK OFFICE
CERTIFICATE OF CORRECTION

PATENT NO. : 7,248,568 B1  Page 1 of 1
APPLICATION NO. : 10/085683
DATED : July 24, 2007
INVENTOR(S) : Peter Loc et al.

It is certified that error appears in the above-identified patent and that said Letters Patent is hereby corrected as shown below:

| | |
|---|---|
| Title Page, Line 6 | Under "Abstract" insert -- of -- after "list" |
| Title Page, Line 9 | Insert -- and -- after "table" |
| Column 4, Line 32 | Delete "1" and insert --I -- |
| Column 5, Line 1 | Delete "one" before "168" |
| Column 6, Line 11 | Delete "be" and insert -- the -- |
| Column 10, Line 10 | Insert -- of -- after "list" |
| Column 10, Line 59 | Insert -- of -- after "list" |
| Column 11, Line 20 | Insert -- of -- after "list" |
| Column 11, Line 48 | Insert -- of -- after "list" |
| Column 12, Line 9 | Insert -- of -- after "list" |
| Column 12, Line 32 | Insert -- of -- after "list" |
| Column 12, Line 38 | Delete "50" and insert -- 60 -- |
| Column 12, Line 43 | Delete "50" and insert -- 60 -- |
| Column 12, Line 46 | Delete "50" and insert -- 60 -- |
| Column 12, Line 49 | Delete "50" and insert -- 60 -- |
| Column 12, Line 53 | Delete "50" and insert -- 60 -- |
| Column 12, Line 62 | Insert -- of -- after "list" |
| Column 14, Line 11 | Insert -- of -- after "list" |

Signed and Sealed this

Sixth Day of November, 2007

JON W. DUDAS
*Director of the United States Patent and Trademark Office*